United States Patent [19]

deFigueiredo et al.

[11] Patent Number: 5,009,903
[45] Date of Patent: Apr. 23, 1991

[54] METHOD OF MAKING FRIED PIE

[75] Inventors: Mario P. deFigueiredo, Chesterfield, Mo.; Richard L. Brady, Belleville, Ill.

[73] Assignee: DCA Food Industries, Inc., New York, N.Y.

[21] Appl. No.: 151,405

[22] Filed: Feb. 2, 1988

[51] Int. Cl.$^5$ .............................................. A21D 8/00
[52] U.S. Cl. ..................................... 426/243; 426/94; 426/302; 426/303; 426/305
[58] Field of Search .................. 426/94, 293, 302, 549, 426/305, 439, 292, 303, 243

[56] References Cited

U.S. PATENT DOCUMENTS

| | | | |
|---|---|---|---|
| Re. 27,531 | 12/1972 | Murray et al. | 426/555 |
| 3,052,545 | 9/1962 | Ducharme | 426/291 |
| 3,208,851 | 9/1965 | Antinori et al. | 426/555 |
| 3,956,515 | 5/1976 | Moore et al. | 426/302 |
| 4,107,338 | 8/1978 | Tutor et al. | 426/293 |
| 4,283,424 | 8/1981 | Manoski et al. | 426/94 |
| 4,375,484 | 3/1983 | Lee et al. | 426/302 |
| 4,487,786 | 12/1984 | Junge | 426/303 |
| 4,496,601 | 1/1985 | Rispoli et al. | 426/554 |
| 4,511,583 | 4/1985 | Olson et al. | 426/94 |
| 4,529,607 | 7/1985 | Lenchin et al. | 426/94 |
| 4,640,837 | 2/1987 | Coleman et al. | 426/289 |
| 4,675,197 | 6/1987 | Banner et al. | 426/243 |
| 4,761,290 | 8/1988 | Meraj et al. | 426/90 |
| 4,764,386 | 8/1988 | Bernacchi et al. | 426/293 |

FOREIGN PATENT DOCUMENTS 3617478  11/1987  Fed. Rep. of Germany ...... 426/289

Primary Examiner—Donald E. Czaja
Assistant Examiner—Mary S. Mims
Attorney, Agent, or Firm—Amster, Rothstein & Ebenstein

[57] ABSTRACT

A process for preparing a fried pie in the nature of a microwavable, pre-fried, batter-coated, dough-enrobed foodstuff and the foodstuff produced thereby. In the process, a foodstuff enrobed with dough is provided, as is an aqueous batter slurry formed by mixing an effective amount of water with a farinaceous based batter mix comprising a farinaceous material selected from the group consisting of starch, flour and mixtures thereof. The batter slurry is applied to the dough of the dough-enrobed foodstuff to coat the same, and the batter-coated dough-enrobed foodstuff is partially cooked in hot fat or cooking oil to pre-fry the same. The fried product is characterized by an acceptable level of crispness after freezing, prolonged freezer storage, and finally microwave cooking.

14 Claims, No Drawings

METHOD OF MAKING FRIED PIE

BACKGROUND OF THE INVENTION

The present invention relates to a method of making a fried pie, and more particularly to a method of making a pre-fried batter-coated foodstuff which may be stored in the frozen state and later cooked in a microwave oven to produce a fried pie with a crisp crust.

Batter coated fried foods have a broad appeal. Among the most popular batter coated foods are fried chicken and fish as well as other meat products; however, a wide variety of other foods, such as vegetables, and even fruits can be coated and then cooked by frying. Deep fried food batters, whether for use with fresh or frozen foods, consist primarily of farinaceous materials such as starches and/or flours along with other optional ingredients such as egg solids, baking powder, cream of tartar, preservatives, seasonings, coloring matter and milk solids. These mixtures are combined with water so as to obtain a desired coating viscosity, whereupon they are applied to the food ordinarily by means of a dip, spray or cascade technique. Before frying, the batter coated food may be coated with a breading such as corn meal, cracker crumbs, bread crumbs or the like if so desired.

Because of the great popularity of batter coated fried foods, there are presently a number of batter formulations and coating procedures. See, for example, U.S. Pat. Nos. 27,531; 3,052,545 and 3,208,851. Many batters have been formulated to prepare frozen, uncooked batter coated or breaded foodpieces which are meant to be subsequently fried. See, for example, U.S. Pat. No. 3,956,515.

In order to obtain a fried product, a batter-coated food piece must be cooked in the presence of frying oils or melted fat at elevated temperatures. Foods thus prepared may be immediately consumed or may be packaged and quick frozen so that the ultimate consumer may prepare the foodstuff merely by reheating. In many cases, the food may only receive a partial cooking or "pre-frying" at this point, whereupon it is packaged and quick frozen with the cooking of the pre-fried frozen foodstuff completed at a later time by the consumer.

A growing trend to spend less time on food preparation has led to a great demand for time saving "ready-to-heat" frozen food products now on the market. The wide use of microwave ovens, now a standard feature in many homes and restaurants, has further led to reduction in cooking time spent by consumers. Many products cooked by means of microwaving or baking are indistinguishable from each other. Unfortunately, frozen pre-fried foodstuffs show strong differences when comparisons are made between final products which have been fried, baked and most particularly microwaved. Microwaved pre-fried products tend to be undesirably soggy, and as such, should not be recommended for microwaving. It is generally known that batter mixes formulated to provide crispy fried products or pre-fried products which are to be later baked do not produce crispy pre-fried products if microwaved instead. There are at least two reasons to which the inferiority of the microwaved products may be attributed.

First, the transfer of heat to a food piece during frying or baking is opposite that for microwaving. Microwave radiation cooks food pieces by exciting the molecules in the water contained therein which in turn acts to cook the entire piece. For this reason, it is often explained that microwave radiation cooks products from the interior outwards, resulting in the coating of a pre-fried piece being the last part to be cooked. During microwaving, the moisture in the food piece is driven outwards towards the surface, which can cause the food piece to become soggy. During frying or baking, on the other hand, the outer coating receives the most exposure to cooking temperatures while the interior receives the least, thus providing a crispy outer coating.

Second, food pieces which are cooked in the presence of hot fat or oil by frying are usually cooked at temperatures of about 35°–425° F. (176°–18° C.), preferably 375°–395° F. (190°–202° C.), which are sufficiently high to fry the food piece. It is recommended that pre-fried food pieces be oven baked at comparable frying temperatures so that residual oil, contained on the surface of all pre-fried foods, will continue to cook the food piece. Microwave ovens, on the other hand, are limited to a cooking temperature within the moisture laden food piece that generally does not exceed the boiling point of water and thus the residual oil retained on a food piece after pre-frying will not continue to cook the piece in the same manner as in frying.

Recent unsuccessful attempts have been made to prepare acceptable pre-fried frozen foodstuffs which remain crispy even when microwaved. Unfortunately such attempts have provided products which demand excessive microwave cooking times, yielding unappealing and unacceptable foodstuffs. Such products have very hard outer coatings which are difficult to bite or even cut with a knife and are therefore an unsatisfactory solution to the problem of soggy products.

Although a batter mix which provides a crispy pre-fried food piece after microwaving is desired, the mix must additionally provide other properties in order to obtain an acceptable product. For example, the interface between the batter coating and food piece after microwaving should preferably be undifferentiatable. The crispness of a food piece becomes overshadowed as the interface worsens by going from thin and dry to floury, bready and finally to pasty. Seepage is also an important concern. Fluid migration during freezing or microwaving may result in the pooling of fluids on the underface of the product resulting in a product which is soggy beneath a crispy coating. The batter should also provide good adhesion and cohesion in order to sustain the pressure of moisture trying to escape during microwaving which can cause "blow outs" leaving a patchy coated food piece. Some batters produce a lacy uneven coating on food pieces. Such a trait is also undesirable because it leads to crumbly coatings. Additionally, the batter should provide a product with an acceptable and appealing final color.

High amylose starch is useful as a coating material for foodstuffs due to its ability to provide uniform films which, if fried, aid in reducing oil absorption and provide crispness to the foodstuff as well. U.S. Pat. No. 4,529,607 describes a method of making a food product which is allegedly crisp after microwaving. The method requires the use of high amylose flour in the batter, however, an undesirable restriction on the freedom of the formulator. High amylose starch (amylose content of 50% or more by weight) is substantially higher in price and considerably less available in quantity than regular or low amylose (high amylopectin) starch. Additionally, the frozen storage life of the product is not indicated as being above 13 days. In order to allow a suitable time after freezing for the product to pass down the marketing chain of distribution and remain in the consumer's freezer for a convenient period of time, a frozen storage life of at least one month, and preferably at least 80 days, is desirable.

Accordingly, it is an object of the present invention to provide a method of making a batter-coated foodstuff which displays an acceptable level of crispness after freezing and subsequent microwave cooking.

Another object is to provide a method of making such a foodstuff having a frozen storage life of at least 80 days.

A further object is to provide a method of making such a foodstuff which may be formulated without the use of high amylose flour.

Still another object is to provide such a foodstuff.

SUMMARY OF THE INVENTION

It has now been found that the above and related objects of the present invention are obtained in a process for preparing a fried pie in a nature of a microwavable, pre-fried, batter-coated dough-enrobed foodstuff. The process comprises the steps of providing a foodstuff enrobed with dough and providing an aqueous batter slurry formed by mixing an effective amount of water with a farinaceous-based batter mix comprising a farinaceous material selected from the group consisting of starch, flour, and mixtures thereof. The batter slurry is applied to the dough of the dough-enrobed foodstuff to coat the same, and the batter-coated dough-enrobed foodstuff is partially cooked in hot fat or cooking oil to pre-fry the same. The pre-fried batter-coated dough-enrobed foodstuff is characterized by an acceptable level of crispness after being subjected to microwave cooking.

In a preferred embodiment the process includes the additional step of freezing said pre-fried batter-coated dough-enrobed foodstuff, or freezing and subjecting it to frozen storage, said frozen or frozen and stored pre-fried batter-coated dough-enrobed foodstuff being characterized by an acceptable level of crispness after being subjected to frozen storage for at least 80 days and then to microwave cooking.

The corn flour may contain corn starch containing less than 50% amylose, based on the starch content of the corn flour, and preferably an amylose content of about 27%. The batter mix preferably contains leavening, such as a mixture of a leavening acid (e.g., sodium aluminum phosphate) and a bicarbonate (e.g., sodium bicarbonate). A flour-based batter typically contains 1.5–4.0%, preferably 3.5% by weight leavening, based on the dry mix, and a starch-based batter typically contains 4–10%, preferably 9% by weight leavening.

In another preferred embodiment the present invention comprises a process for preparing a fried pie in the nature of a microwavable, frozen, pre-fried, batter-coated, dough-enrobed foodstuff. The process comprises the steps of providing a foodstuff enrobed with dough and providing an aqueous batter slurry which is either starch based and characterized by viscosity of about 275–500 cps or flour based and characterized by a viscosity of about 100–725 cps, each on an LVF Brookfield viscosimeter using spindle #2 at a speed of 12 rpm. The batter slurry is formed by mixing an effective amount of water with a farinaceous-based batter mix comprising leavening and a farinaceous material selected from the group consisting of starch, corn flour containing less than 50% amylose (preferably about 27%), based on the starch content of said flour, and mixtures thereof. The batter slurry is applied to the dough of the dough-enrobed foodstuff to coat the same. The batter-coated dough-enrobed foodstuff is partially cooking in hot fat or cooking oil by flash frying the same for a period of time sufficient to set the batter to pre-fry the same. Then the pre-fried batter-coated dough-enrobed foodstuff is frozen. The frozen pre-fried batter-coated dough-enrobed foodstuff is characterized by an acceptable level of crispness after being subjected to frozen storage for at least 80 days and then to microwave cooking.

The present invention also encompasses the foodstuff produced by the process. The foodstuff produced by the process is a fried pie comprising a microwavable, pre-fried, batter-coated dough-enrobed foodstuff, characterized by an acceptable level of crispness after being subjected to microwave cooking. The batter includes a mixture of an effective amount of water and a farinaceous-based batter mix comprising a farinaceous material selected from the group consisting of starch, flour, and mixtures thereof and is disposed on the dough of the dough-enrobed foodstuff to coat the same prior to partial cooking of the batter-coated dough-enrobed foodstuff in hot fat or cooking oil to pre-fry the same.

DETAILED DESCRIPTION OF THE PREFERRED EMBODIMENTS

The method of the present invention may be used in preparation of all types of pre-fried fresh and frozen foodstuffs which are to be frozen and later microwaved including fish, shellfish, poultry, meat and vegetable products including fish steaks, fish filets, whole fish, scallops, oysters, clams, shrimps, lobster parts, chicken and turkey parts, veal, beef, pork, eggroll stuffing, egq omelet, eggplant, onion rings, fish with Swiss cheese and Canadian bacon, fish with one or more of the following sauces: French white sauce, Newburg, au gratin, cheddar cheese, cajun and the like, etc. All these foodstuffs may be in solid or chunk form. Because they will ultimately be enrobed with dough, they may also be in chopped, diced, grated or other comminuted forms useful as fillings, and two or more of the foodstuffs may be mixed together.

A preferred filling for use in the present invention is a Standard Pizza Filling made from ground beef, pizza sauce, mozzarella cheese, modified food starch, and spices according to the formulation of Table I, wherein all parts are by weight. The filling is prepared by cooking ground beef in a skillet, draining the fat off, and allowing the cooked beef to cool. Thereafter all of the ingredients are weighed into a mixing bowl, where they are blended with a Hobart mixer until a uniform consistency is obtained.

A preferred dough for use in the present invention is a Standard Pie Dough according to the formulation in Table II, wherein all parts are by weight. The dry ingredients of the pie dough are mixed with an appropriate ratio of water and sheeted, for example, using a Colborne dough sheeter. As a means of measuring the thickness of the dough, the sheeted dough may be cut into standard size pieces and weighed. It is preferred that the thickness of the dough be kept at a level of 65–75 grams for a 6"×8" (15 cm×20 cm) piece of dough prior to pie formation. Thinner doughs (45–55 grams) and heavier doughs (85 grams) were also crisp, but with the thin dough the filling was easily seen through the dough and the dough itself was very brittle and easily broken, and with the thick dough the dough does not cook properly.

The dough-enrobed foodstuff or pie may be formed using a conventional pastry maker, such as the Colborne Mono-Pastry and Turnover Maker machine (using #3 dies) which simultaneously forms, trims, seals and crimps the pies. During this process, the 6"×8" dough piece weighing 65-75 grams is reduced in size and weight to form the 3"×4⅜" (75 mm×110 mm) D-shaped pie about 1¼" (32 mm) thick, so the weight of the dough in the finished pie varies preferably from 33 to 40 grams. The excess dough is reworked or discarded.

The useful batters for the present invention are farinaceous-based. They may be starch based, or based on mixtures of starches and flours. A preferred starch based dry mix formulation is set forth in Table III as the Standard Starch Batter; a preferred flour based dry mix formulation is set forth in Table IV as the Standard Flour Batter. All formulations are based on weight. The viscosity of the aqueous batter slurry (i.e., dry mix formulation plus water) should be such that an even coating is attained on the pie without excessive blow-off of batter in the fryer. The slurry must be thin enough to handle during application procedures, yet thick enough for adequate coverage of the dough. Within these parameters, typically the higher viscosities give better products. The percentage pickup of batter will depend on the batter formulation and the viscosity thereof. It is well within the competence of one skilled in the baking arts to adjust the viscosity as necessary to meet the needs of particular batter formulations.

The preferred starch-based batter is preferably mixed one part dry to 2.4 parts water, to provide an HAF Brookfield viscosity of 540 cps (spindle 1, 10 rpm, factor 20). The preferred batter had a batter/oil pickup of 5.0% for 40 grams of filling and approximately 34-37 grams of dough. A thinner batter (mix ratio 1:3, viscosity 100 cps) gave a soft coating and a low batter/oil pickup of 3.0%, while a thicker batter (mix ratio 1:2.1, viscosity 1570 cps) resulted in a high batter/oil pickup of 5.7% and excessive blowoff in the fryer. The same preferred starch based batter may preferably be mixed at a mix ratio of one part dry to 2.75 parts water, to provide a viscosity of 500 cps (LVF Brookfield viscosimeter, spindle #2, 12 rpm, factor 25, reading taken at thirty seconds) equivalent to a Zahn Cup viscosity of 16.4 seconds (cup #3). More broadly, viscosities in the range of 275-500 (Brookfield) and 11.8-16.4 seconds (Zahn) were optimum.

The preferred flour-based batter is preferably mixed at a mix ratio of 1 part dry to 1.25 parts water, to provide a viscosity of 725 cps (LVF Brookfield, spindle #2, 12 rpm, factor 25) equivalent to 23.6 seconds (Zahn). More broadly speaking, the optimum viscosity was 100-725 cps (Brookfield) and 9.8-23.6 seconds (Zahn).

In using a flour based batter, the crispness of the final product appears to vary with the amount of yellow corn flour used, no corn flour or 15% corn flour providing a semi crisp product, 30% corn flour providing a very acceptable crispness, and 45% corn flour providing an even crisper product. The corn starch present in the yellow corn flour contains less than 50% amylose by weight, preferably about 27%, based on the starch content of the flour. To prevent the development of air bubbles between the dough and batter layers when using a flour-based batter, 10 percent modified starch may be added to the batter. Soft wheat flours have not been found to perform satisfactorily when employed as the sole flour in a flour-based batter mix.

The leavening in the batter provides an open structure which contributes to the crisp texture of the batter in the final product. While the preferred level of leavening is 9% by weight in a starch based batter (dry mix), a reduced level of 4.4% or even 3.5% is also sufficient for the purposes of the present invention. If the leavening level is too low, the starch-based batter forms a smooth hard coating which looks like a sugar coating, but is not really crisp. It is believed that the smooth hard coating is a result of the starch components. The preferred level of leavening is 3.5% by weight in a flour-based batter (dry mix), although levels of 1.5%-4.0% are also effective. The leavening is preferably formed from a leavening acid (such as sodium aluminum phosphate) and a bicarbonate (such as a sodium bicarbonate).

Inspection of the microwave reconstituted product reveals a very crisp outer batter layer which is very slightly separated from the softer moisture laden pie crust (i.e., dough layer). This outer layer is believed to contribute greatly to attainment of the desired sensation of crispness. While some slight separation between the dough and batter layers appears to be desirable, a substantial separation, such as might evidence the formation of air pockets, is considered undesirable.

It will be appreciated that the term "pie", as used herein and in the claims, broadly encompasses any dough-enrobed foodstuff. For example, a microwavable eggroll prepared according to the present invention is to be deemed a pie.

It will further be appreciated that prior to partial cooking of the batter-coated dough-enrobed foodstuff in hot fat or cooking oil to prefry the same, additional outer coatings may be applied to the batter-coated dough-enrobed foodstuff. For example, as is conventional in the batter-coating art, an outer coating of breading may be applied. Alternatively, prior to application of the outer batter coating according to the present invention a coating of batter and breading, as is conventional in the batter-coating art, may be applied to the dough-enrobed foodstuff. Thereafter the batter of the present invention is applied to the breading-coated dough-enrobed foodstuff so that the batter and breading coating becomes an intermediate coating between the dough-enrobed foodstuff and the outer batter coating.

The following examples illustrate the efficacy of the present invention in the production of a crisp pie. All parts are by weight unless otherwise indicated.

TABLE I

| STANDARD PIZZA FILLING | |
|---|---|
| | % |
| COOKED GROUND BEEF | 49.5 |
| DRAINED OFF BEEF FAT | 9.8 |
| RAGU PIZZA SAUCE (REGULAR) | 24.7 |
| SALT | 0.5 |
| GROUND OREGANO | 0.5 |
| GROUND BLACK PEPPER | 0.1 |
| ONION POWDER | 0.2 |
| GARLIC POWDER | 0.2 |
| MOZZARELLA CHEESE | 12.5 |
| STALEY GELATINIZED DURA-GEL | 2.0 |
| (modified food starch) | |
| | 100.0 |

TABLE II
STANDARD PIE DOUGH

| | % |
|---|---|
| BLEACHED WHEAT FLOUR | 79.4250 |
| PARTIALLY HYDROGENATED VEGETABLE SHORTENING | 16.6875 |
| SUGAR | 1.1875 |
| SALT | 0.8125 |
| WHEY | 0.6875 |
| CALCIUM CASEINATE/WHEY BLEND | 0.5000 |
| SODIUM ACID PYROPHOSPHATE | 0.3750 |
| SODIUM BICARBONATE | 0.3125 |
| VITAMIN ENRICHMENT | 0.0125 |
| | 100.0000 |

TABLE III
STANDARD STARCH BATTER

| | % | Range, % |
|---|---|---|
| MODIFIED FOOD STARCH | 68.25 | 64–74 |
| GELATINIZED WHEAT STARCH (Gelatinized Starch) | 15.0 | 10–20 |
| SODIUM ALUMINUM PHOSPHATE (Leavening Acid) | 4.5 | 2–5 |
| SODIUM BICARBONATE | 4.5 | 2–5 |
| SALT | 4.425 | 3–5 |
| DEXTROSE (Browning Agent) | 1.375 | 1–3 |
| SOYBEAN OIL (Processing Aid) | 0.575 | |
| OLEORESIN BLACK PEPPER | (0.5625) | 0–0.4* |
| GROUND CELERY SEED | (0.1875) | |
| TRIACETIN (Processing Aid) | 0.625 | |
| | 100.0000 | |

*spices, color

TABLE IV
STANDARD FLOUR BATTER

| | % | Range, % |
|---|---|---|
| BLEACHED WHEAT FLOUR | (41.0) | 44–54 |
| WHEAT FLOUR | (8.0) | |
| YELLOW CORN FLOUR | 30.75 | 25–45 |
| SUGAR | 8.0 | 3–13 |
| SALT MED BULK | 7.0 | 4–10 |
| SODIUM BICARBONATE | 1.75 | 0.75–2.00 |
| SODIUM ALUMINUM PHOSPHATE (Leavening Acid) | 1.75 | 0.75–2.00 |
| CALCIUM CASEINATE/WHEY BLEND (Browning Agent) | (0.99) | 0.75–2.00 |
| WHEY (Browning Agent) | (0.76) | |
| | 100.00 | |

EXAMPLES

Standard Test Procedure

The following procedure was used in all examples, except as otherwise stated.

The filling used as the Standard Pizza Mix was made from ground beef, pizza sauce, mozzarella cheese, modified food starch and spices, as indicated in Table I. The amount of filling varied from 40–50 grams.

The Standard Pie Dough (see Table II) was mixed with water (1 part dry: 0.3 parts water) and sheeted using the Colburne Dough Sheeter. As a means of measuring the thickness of the dough, the sheeted dough was cut into 6"×8" (152 mm×203 mm) pieces and weighed. The weights of the pieces were 65–75 grams.

Pies were formed using the Colborne Mono Pastry and Turnover Maker (Die #3) which simultaneously forms, trims, seals and crimps the pies. In this process the 6"×8" dough piece was reduced in size and weight to form the 3"×4⅜"×1¼" (75 mm×110 mm×32 mm) D-shaped pie, and so the weights of the dough in the finished pies varied from 33 to 40 grams. The excess dough was reworked or discarded.

The pies were then battered by hand (if required) using either the Standard Starch Batter (see Table III) or the Standard Flour Batter (see Table IV). The battered pies were then flash fried at 390° F. (199° C.) for 30 seconds.

The pre-fried pies were blast frozen and then kept in the freezer for 24 hours at 0° F. (−18° C.) before taste panelling. The product was then heated in a 900 watt microwave —at high power for 4 minutes for 4 pies or until the internal temperature was approximately 140°–150° F. (60°–66° C.). They were then allowed to sit for 5 minutes before testing.

EXAMPLE I

Purpose: To determine the effect on crispness of battering a pie.

This comparison involved pies utilizing the Standard Pizza Filling and Standard Pie Dough, with one pie receiving a batter (formulated by mixing one part of dry Standard Starch Batter with 2.4 parts of water to provide a resultant batter mix composition having a viscosity of 600 cps) and the other pie not receiving a batter. The average weight of the formed and fried pies was as follows:

| | With | Without |
|---|---|---|
| Pizza Filling | 50 g | 50 g |
| Formed Dough | 38.6 g | 38.6 g |
| Batter & Oil | 6.3 g | |
| Frying Oil | | 3.5 g |
| Total wts.: | 94.9 g | 92.1 g |

Taste Panel Results: The pie with the batter coating was crisp, while the pie without the batter coating was soft. It is concluded from this that for crispness there needs to be some sort of coating on top of the pie dough.

EXAMPLE II

Purpose: To determine whether the crispness results from putting one coating on top of another (i.e., a dough interface) or whether a batter on top of the dough is required.

In Test A, two layers of dough were used. Each dough layer was thinner than the standard 65–75 grams for a 6"×8" piece. The inner dough layer was cut from 6"×8" pieces weighing 59–60 g. (30–35 g. of finished pie weight) while the outer dough layer was cut from 6"×8" pieces weighing 40–48 g. (13–18 g of finished pie weight).

Average wts. of fried finished pies:

| Pizza Filling | 50 g |
|---|---|
| Inner Dough Layer | 32.7 g |
| Outer Dough Layer | 15.2 g |
| Oil (frying) | 2.8 g |
| | 100.7 g |

The double dough layered product was fried for 1 minute at 390° F. as there was no color development after 30 seconds. The product did not look crisp out of the fryer, just covered with brown blisters caused by shortening in the pie dough.

Taste Panel Results: The pies were not crisp at all It is concluded that for crispness more was required than a simple dough interface.

In Test B, the outer pie dough layer was converted into a batter by mixing the dry pie dough mix with various amounts of water in order to produce the noted viscosity (Brookfield Model HAF, spindle 1, 10 rpm, factor 20):

(a) Mixed 1.5, viscosity 960 cps.
(b) Mixed 1:1.75, viscosity 270 cps.

| Average wts of fried finished pies: | | |
|---|---|---|
| | (a) | (b) |
| Pizza Filling | 50 g | 50 g |
| Dough | 34.2 g | 39.5 g |
| Batter & Oil | 5.2 g | 3 g |
| | 89.4 g | 92.5 g |

These pies battered with diluted pie dough were also not crisp after microwaving. It is concluded that for crispness a water diluted pie dough does not function as a batter.

EXAMPLE III

Purpose: To determine if crispness results simply from using a batter by comparing for crispness a battered dough-enrobed substrate (i.e., a battered pie) and a battered unenrobed substrate.

A solid foodstuff was used as the substrate since a comminuted foodstuff would not hold together in the absence of the dough. A boneless, raw chicken breast was used as the substrate. One aliquot was battered with the Standard Flour Batter (one part dry: 1.25 parts water) while the other aliquot was enrobed with the Standard Pie Dough and then battered with the Standard Flour Batter (one part dry: 1.4 parts water). Both battered products were pre-fried at 395° F. (202° C.) for 35 seconds, blast frozen and held at 0° F. (−18° C.) for 24 hours. The products were microwaved on full power until an internal foodstuff temperature of 175° F. (79° C.) was reached.

The average weights and percentage coatings were as follows:

| Battered Substrate: | |
|---|---|
| Average weight chicken | 56.0 g |
| Average weight batter* | 14.7 g |
| Average total fried weight | 70.9 g |
| Average percent total coating (fried) | 21.0% |
| Battered Dough Enrobed Substrate: | |
| Average weight chicken | 56.1 g |
| Average weight dough & chicken | 96.6 g |
| Average weight dough | 40.5 g |
| Average weight batter* | 17.4 g |
| Average total fried weight | 106.2 g |
| Average percent total coating (fried) | 47.2% |

*These values are approximates as the actual amount of batter cannot be determined due to batter fall off.

The battered dough-enrobed substrate (that is, the battered pie) is crisp, while the battered substrate is soggy and not crisp. It is concluded that the batter by itself does not produce crispness and that for crispness there needs to be a dough intermediate the foodstuff and the batter.

EXAMPLE IV

Purpose: To determine whether the battered pies retain crispness after 80 days in freezer storage.

Pies with pizza fillings were made, as were dough-enrobed plain and western omelettes (the omelette fillings being obtained from Del Monte of San Francisco, Calif.). Fifty grams of pizza filling were used for 40-45 grams of pie dough and 35-45 grams of omelette filling were used per 40 grams of the pie dough. The pies were passed through the Standard Starch Batter (one part dry: 2.5 parts water), flash fried for 30-35 seconds at 390° F. (199° C.), blast frozen, and kept in freezer storage at 0° F. (−18° C.) for 80 days. A panel of 20 panelists tasted the pies for both crispness and acceptability.

Test Panel Results: The type of filling made no appreciable difference. Most pies were considered at least moderately crisp (the middle value) on a scale extending from "not crisp at all" to "extremely crisp," and most pies were deemed moderately or very acceptable for coming out of a microwave. It is concluded from this that the two coating system of pie dough and batter coating provides sufficient protection against the deleterious effects of moisture transfer usually experienced during frozen product storage.

To summarize, the present invention provides a method of making a batter-coated foodstuff which displays an acceptable level of crispness after freezing and subsequent microwave cooking. The foodstuff has a frozen storage life of at least eighty days and may be formulated without the use of high amylose flour.

Now that the preferred embodiments of the present invention have been described in detail, various modifications and improvements thereon will become readily apparent to those skilled in the art. Accordingly, the appended claims are to be construed broadly and in a manner consistent with the spirit and scope of the present invention.

I claim:

1. A process for preparing a fried pie in the nature of a microwavable, pre-fried, batter-coated dough-enrobed foodstuff comprising the steps of:
   (a) providing a foodstuff enrobed with uncooked dough and providing an aqueous batter slurry formed by mixing an effective amount of water with a farinaceous-based batter mix comprising a farinaceous material selected from the group consisting of starch, flour, and mixtures thereof;
   (b) applying said batter slurry to the uncooked dough of the dough-enrobed foodstuff to coat the same; and
   (c) partially cooking the batter-coated dough-enrobed foodstuff in hot fat or cooking oil to pre-fry the same;
said pre-fried batter-coated dough-enrobed foodstuff being characterized by an acceptable level of crispness after being subjected to microwave cooking.

2. The process of claim 1 including the additional step of freezing said pre-fried batter-coated dough-enrobed foodstuff, said frozen pre-fried batter-coated dough-enrobed foodstuff being characterized by an acceptable level of crispness after being subjected to microwave cooking.

3. The process of claim 2 wherein said frozen pre-fried batter-coated dough-enrobed foodstuff is characterized by an acceptable level of crispness after being subjected to frozen storage for at least 80 days and then to microwave cooking.

4. The process of claim wherein in step (c) the batter-coated dough-enrobed foodstuff is partially cooked by flash frying for a period of time sufficient to set the batter.

5. The process of claim 1 wherein said flour is corn flour containing less than 50% amylose, based on the starch content of said flour.

6. The process of claim 5 wherein said corn flour has an amylose content of about 27%.

7. The process of claim 1 wherein said batter mix additionally contains leavening.

8. The process of claim 1 wherein said aqueous batter slurry is starch based and has a leavening content of 4–10% by weight or flour-based and has a leavening content of 1.5–4.0% by weight, based on the dry batter mix.

9. The process of claim 1 wherein said aqueous batter slurry is starch-based and has a viscosity of about 275–500 cps or is flour-based and has a viscosity of about 100–725 cps, each on an LFV Brookfield viscosimeter using spindle #2 at a speed of 12 rpm.

10. The process of claim 1 further comprising the steps of freezing said pre-fried batter coated dough-enrobed foodstuff and cooking said frozen foodstuff by microwaving.

11. A process for preparing a fried pie in the nature of a microwavable, frozen, pre-fried, batter-coated dough-enrobed foodstuff comprising the steps of:
(a) providing a foodstuff enrobed with uncooked dough and providing an aqueous battery slurry which is starch-based and has a viscosity of about 275–500 cps or is flour-based and has a viscosity of about 100–725 cps, each on a LVF Brookfield viscosimeter using spindle #2 at speed 12 rpm, factor 25, and formed by mixing an effective amount of water with a farinaceous-based batter mix comprising leavening and a farinaceous material selected from the group consisting of starch, corn flour containing less than 50% amylose, based on the starch content of said flour, and mixtures thereof;
(b) applying said batter slurry to the uncooked dough of the dough-enrobed foodstuff to coat the same;
(c) partially cooking the uncooked batter-coated dough-enrobed foodstuff in hot fat or cooking oil by flash frying for a period of time sufficient to set the batter to pre-fry the same; and
(d) freezing said pre-fried, batter-coated dough-enrobed foodstuff;
said frozen pre-fried, batter-coated dough-enrobed foodstuff being characterized by an acceptable level of crispness without being objectionably chewy and doughy after being subjected to frozen storage for at least 80 days and then to microwave cooking.

12. The process of claim 1, wherein said pre-fried, batter-coated dough-enrobed foodstuff is characterized by an acceptable level of crispness without being objectionably chewy and doughy after being subjected to microwave cooking.

13. The process of claim 2, wherein said frozen, pre-fried, batter-coated dough-enrobed foodstuff is characterized by an acceptable level of crispness without being objectionably chewy and doughy after being subjected to microwave cooking.

14. The process of claim 1 wherein in step (c) the uncooked batter-coated dough-enrobed foodstuff is partially cooked to pre-fry the same.

* * * * *